United States Patent
Tantlinger

[11] 3,815,307
[45] June 11, 1974

[54] ROOF-TO-SIDEWALL UNIT METHOD JOINT STRUCTURE FOR TRANSPORTATION TYPE VEHICLES

[75] Inventor: Keith W. Tantlinger, Coronado, Calif.

[73] Assignee: Rohr Industries, Inc., Chula Vista, Calif.

[22] Filed: May 5, 1972

[21] Appl. No.: 250,634

[52] U.S. Cl. .................. 52/285, 52/588, 296/28 A, 296/137 R
[51] Int. Cl. ............................................. B62d 31/02
[58] Field of Search .......... 287/189.36 D, 189.36 R; 52/580, 588, 45, 309, 285; 296/31 P, 29, 30, 28, 28 A, 137 R

[56] References Cited
UNITED STATES PATENTS

| | | | |
|---|---|---|---|
| 2,268,636 | 1/1942 | Becker | 52/580 |
| 2,471,917 | 5/1949 | Wilson | 296/29 X |
| 2,600,140 | 6/1952 | Torseth | 296/29 X |
| 3,001,613 | 9/1961 | McBerty | 52/580 |
| 3,013,103 | 12/1961 | Pettler et al. | 287/189.36 D X |
| 3,131,649 | 5/1964 | Eggert | 296/29 X |
| 3,295,283 | 1/1967 | Griffith et al. | 287/189.36 R X |
| 3,713,679 | 1/1973 | Beschmann et al. | 287/189.36 D |

FOREIGN PATENTS OR APPLICATIONS

| | | | |
|---|---|---|---|
| 1,127,915 | 9/1968 | Great Britain | 296/31 P |

Primary Examiner—Thomas F. Callaghan

[57] ABSTRACT

The roof structure of a ground transportation vehicle is manufactured as a unit in its respective jig, complete with all components, accessories, finish and trim, as are also each of the vehicle sidewalls, the latter preferably complete with seats of cantilever or semi-cantilever type. Each sidewall is connected to an edge of the roof structure by a joint comprising a downwardly open channel embodied in each side of the roof structure, and a cooperating, upwardly open channel incorporated in the upper edge of each side wall. Each roof structure channel is supported on, and interlockingly connected to its corresponding sidewall channel with the channels in relatively inverted, complimentary relation, and each roof-to-sidewall joint is completed by fastening means applied by workers working exteriorly of the vehicle. The relatively inverted channels along each side of the vehicle define a duct for containing cables, or as an element of an air conditioning system.

5 Claims, 1 Drawing Figure

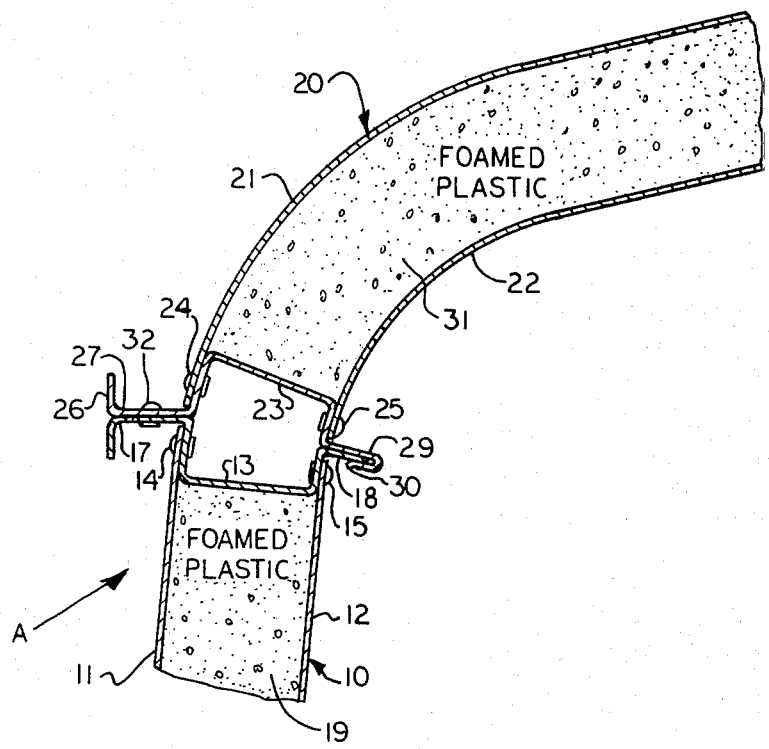

3,815,307

ROOF-TO-SIDEWALL UNIT METHOD JOINT STRUCTURE FOR TRANSPORTATION TYPE VEHICLES

BACKGROUND OF THE INVENTION

The present invention is directed to a vehicle roof-to-sidewall joint structure as are also those disclosed in two pending patent applications by Theodor C. Schubach and assigned to the same assignee as the present invention, i.e., application Ser. No. 230,689, filed Mar. 1, 1972 and application Ser. No. 232,821, filed Mar. 8, 1972 and now U.S. Pat. No. 3,740,089.

In the past, in making a transportation type vehicle such as a bus, or a car for a mass transportation system, it has been customary to erect on a partly completed chassis or base structure the frame structure or shell for the sidewalls and roof of the vehicle, which is then completed by the installation of electrical wiring, air conditioning equipment, heating and cooling ducts, fixtures, trim, seats, floor covering, etc. Such "stick type" construction is slow and costly, with artisans of various trades working interiorly of the car from the time the sidewall and roof frames or shells are erected on the base structure until the final interior decoration is completed and the floor covering laid. Such work is difficult to plan, schedule, supervise, and perform, and there is a constant possibility that one or another crew of workers may damage or soil work already performed, thereby causing duplication and delay and adding to cost.

PURPOSE OF THE INVENTION

A primary objective of the present invention is to provide an improved structure and method for manufacturing a transportation type vehicle, wherein finished roof structure and sidewalls, with all assemblies, components and accessories installed therein, and interior finish applied, are each manufactured to finished form in individual jigs, which are positioned for maximum worker accessibility and efficiency. The finished roof structure and sidewalls are then removed from their respective jigs, and are interlocked and permanently interconnected on a usual car base structure, whereupon the interior of the vehicle is completed, or substantially so, and the upper edge of each sidewall cooperates with the side of the roof structure to support the roof structure in relatively interlocked relation therewith, and to define a duct therebetween.

BRIEF DESCRIPTION OF THE DRAWINGS

The foregoing objectives of the invention will be apparent from the following description and the accompanying drawing, therein the single FIGURE is a fragmentary, vertical, transverse, sectional view of the roof-to-sidewall joint area of a vehicle embodying the present invention.

DETAILED DESCRIPTION OF THE DRAWINGS

Referring to the drawing in detail, the upper portion of the sidewall 10 of a transportation type vehicle A, such as a bus, or a car for a mass transit railway system, comprises an outer wall member 11 of suitable material such as sheet aluminum, or one or more suitable extrusions, and a liner 12 also of suitable material. A channel member 13 is fitted in upwardly open position into the space between the sidewall members 11 and 12, and is secured thereto as an integral element of the wall by suitable fastening means such as rivets 14 and 15, respectively.

A flange 17, integral with the upper edge of the outer side flange of channel 13, is bent to extend outwardly, and a second flange 18 is bent to extend inwardly from the upper edge of the inner flange of channel 13. The space between the sidewall sheet 11 and liner 12 preferably is filled with a suitable, light weight, structural material 19 such as a poured-in-place polyurethane foam, which strengthens and insulates the sidewalls without adding materially to vehicle weight.

The vehicle roof structure 20 comprises an outer roof member 21 of suitable material such as sheet aluminum or an extrusion, and a liner 22, also of suitable material. The side portions of the roof members 21 and 22 curve downward symmetrically along both sides of the roof structure so as to be in substantial alignment with the wall sheet members 11 and 12, respectively, at their respective lines of juncture when the roof structure is mounted on the sidewalls as shown in the drawing. A channel member 23 is fitted in downwardly open position into the space between the lower edge portions of the roof members 21 and 22 along each side of the vehicle, the side flanges of the channel 23 being curved to conform to the curvature of the roof members 21 and 22. The channel 23 is secured in position to the roof members 21 and 22 by rivets 24 and 25, respectively.

A flange 27, integral with the lower edge of the outer side flange of the roof channel 23, extends outwardly for superposed, conforming relation with the outer flange 17 of the wall channel 13 on the same side of the vehicle A, and an upturned flange 26, integral with the outer edge of the flange 27, provides, in conjunction with the flange 27 and the lower marginal portion of the roof structure, a rain gutter for runoff water from the roof.

A flange 29 also extends inwardly from the lower edge of the inner side flange of each roof channel 23 for superposed, conforming relation with the inner flange 18 of the side wall channel member 13 on the same side of the vehicle A, and a reversely bent locking flange 30 is provided on the outer edge of each inwardly extending flange 29, and is spaced from its respective flange 29 to receive the inner flange 18 of its corresponding sidewall with a light press fit therebetween. The space between the roof sheet 21 and liner 22, like the sidewalls, is filled with a suitable light structural material 31 such as polyurethane foam.

Each vehicle sidewall 10 and roof structure 20 have all specified accessories, equipment, ducts, fixtures, trim, etc. installed therein and finish applied thereto during manufacture in their respective jigs, not shown, which may be of any suitable or conventional type, so that the sidewalls and roof structure are completely finished prior to assembly with each other.

OPERATION

Although the sequence of assembly of the roof structure, sidewalls and a vehicle base structure, not shown, is not necessarily fixed, it is preferred at present to first assemble the roof structure 18 and sidewalls 10 to their completed, finished form. In thus assembling the individually completed sidewalls and roof structure, the sidewalls are erected and the roof structure 20 is lowered onto the walls with each sidewall and its corresponding edge of the roof structure relatively offset so that each sidewall flange 18 is outwardly clear of its respective locking flange 30. The sidewalls and roof structure are then moved relatively to each other to force each flange 18 into interlocked position between its respective flanges 29 and 30. Rivet holes are punched in the superposed outer flanges 17 and 27, and rivets 32 are inserted in these holes and set by workers working exteriorly of the vehicle, thus permanently securing the walls to the roof structure and preventing relative displacement therebetween.

The lower ends of the vehicle sidewalls, not shown, are then fitted to a usual vehicle base structure, not shown, and secured thereto in any conventional or desired manner. The base structure employed preferably has a usual floor covering, such as carpeting or tile, not shown, applied thereto prior to assembly with the sidewalls, so that it is unnecessary after such assembly to perform any further work inside the vehicle or even to have any workmen enter the car.

The vehicle end portions, not shown, may be completed and attached to the assembled base structure, walls and roof structure in any suitable or well known manner. However, the end portions of such vehicles may be manufactured in widely different ways, and since such manufacture, and the assembly of such end portions with the remainder of the vehicle are not features of the present invention, they are not shown or described herein.

The invention provides a simple, efficient, and economical joint for connecting the roof structure of a vehicle to the sidewalls thereof, the two relatively reversed channels of which comprise not only a very strong structural element, but also a duct with substantial potential utility.

Thus, by means of this invention, low cost labor areas are used with minimum freight penalty, and the facilities for, and operations connected with, final assembly are minimized.

Having thus described my invention, what I claim as new and useful and desire to protect by U.S. Letters Patent is:

1. In a transportation type vehicle having sidewalls and a roof structure, supported thereon, a roof-to-sidewall joint structure comprising, a downwardly open channel member of selected width incorporated as an integral, structural element along each side of the roof structure, an upwardly open channel member incorporated as an integral, structural element in the upper edge of each sidewall, each sidewall channel member being of a width corresponding substantially to that of the channel member incorporated in the roof structure on the same side of the vehicle, a riveting flange incorporated in the lower, outer edge portion of each side of the roof structure and extending outwardly therealong, a riveting flange incorporated in the upper, outer edge portion of each sidewall and extending outwardly therealong in underlying, contacting relation with the roof structure riveting flange along the same side of the vehicle, and a row of rivets securing together the riveting flanges along each side of the vehicle, and means securing the upper end of each sidewall to the lower end of each roof structure said means comprising;

an interlocking flange incorporated in, and extending inwardly along, the lower, inner edge portion of each side of the roof structure, an interlocking flange incorporated in, and extending inwardly along, the upper, inner edge portion of each side wall to underlie, in contacting relation, the roof structure interlocking flange along the same side of the vehicle, one of the interlocking flanges along each side of the vehicle having a reversely bent portion integral with the inner edge thereof, each reversely bent flange portion being spaced from its respective said one flange, and each other flange on the same side of the vehicle being fitted in interlocked relation between its respective said one flange and the reversely bent portion thereof.

2. A roof-to-sidewall joint structure as claimed in claim 1 wherein the roof structure comprises an outer sheet metal member and an inner sheet metal member of substantially conforming shape and spaced inwardly therefrom, and one of the roof member channel members is fitted in conforming relation between, and is secured to, the spaced apart lower edge portions of the outer and inner sheet metal roof structure members along each side of the roof structure.

3. A roof-to-sidewall joint structure as claimed in claim 2 wherein the space between the outer and inner sheet metal roof structure members is filled with structural plastic foam material.

4. A roof-to-sidewall joint structure as claimed in claim 1 wherein the riveting flange incorporated in the lower, outer edge portion along each side of the roof structure is integral with the lower, outer edge portion of its associated roof structure channel member, and the riveting flange incorporated in the upper, outer edge portion of each sidewall is integral with the upper, outer edge portion of its associated sidewall channel member.

5. A roof-to-sidewall joint structure as claimed in claim 1 wherein the interlocking flange incorporated in the lower, inner edge portion along each side of the roof structure is integral with the lower, inner edge of its associated roof structure channel member, and the interlocking flange incorporated in the upper, inner edge portion of each sidewall is integral with the upper, inner edge portion of its associated sidewall channel member.

* * * * *